United States Patent Office 2,938,877
Patented May 31, 1960

2,938,877

STABILIZED HALOGEN-CONTAINING RESINS

Gerry P. Mack, Jackson Heights, and Emery Parker, New York, N.Y., assignors, by mesne assignments, to Carlisle Chemical Works, Inc., Reading, Ohio, a corporation of Ohio No Drawing. Filed June 17, 1954, Ser. No. 437,568

4 Claims. (Cl. 260—23)

The invention relates to halogen-containing resin compositions and to a method of stabilizing such compositions against discoloration upon prolonged exposure to elevated temperatures.

As the invention is particularly useful in connection with vinyl chloride polymers and copolymers, it will be described in connection with such compositions.

Such copolymers are obtained by polymerization of vinyl chloride with other copolymerizable compounds, for instance with vinyl acetate or other vinyl esters, maleates, fumarates, acrylates, methacrylates, and others. It is, however, to be understood that the invention is not limited to such compositions but applies equally to other resin compositions containing halogen, such as chlorine or bromine.

Vinyl chloride resin compositions are exposed to elevated temperatures in various stages of the manufacturing process, such as in calendering, extruding, slush molding, and other operations. Under these conditions, the resins tend to discolor and to decompose with liberation of hydrochloric acid. It is well known to add stabilizers to the resin blends to prevent such discoloration and decomposition, and a great variety of stabilizers have been proposed for this purpose. One class of stabilizers consists of metal salts of medium and high molecular weight fatty acids, which are preferably used as a combination of salts of the earth alkali metals, such as calcium, strontium, barium, together with such salts of the heavy metals, such as cadmium, zinc, lead, and tin. Another class of stabilizers are organo-metallic compounds, particularly monomeric or polymeric organotin compounds, of which a large number has been described in the literature and patent are as suitable stabilizers.

It has also been proposed to increase or prolong the stabilizing effect of the hereinabove recited so-called primary stabilizers by the addition of auxiliary stabilizers. Such auxiliary stabilizers are, for instance trialkyl and triaryl phosphites, also other esters of phosphorous acid, sulphides, and other high molecular weight antioxidants.

Heretofore, it has been generally assumed that the auxiliary stabilizers must not contain chlorine because their efficiency was attributed to their capability to act in some way as an acceptor for halogen or hydrogen halide split off from the vinyl halide chain under the influence of heat or light.

We have found that very unexpectedly the general rule to avoid chlorine containing additions in the processing of vinyl halide compositions does not apply to a group of organic esters of phosphorous acid which is represented by the structural formula

where R, R' and R'' are the same or different aliphatic, alicyclic or aromatic groups containing at least one halogen, which halogen will be in most cases chlorine but may also be bromine.

The halogen-containing phosphorous acid esters are most conveniently prepared by reacting a phosphorus trihalide with an epoxide compound. In the simplest case, the reaction can be represented by the equation (1) 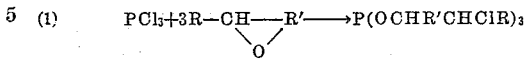

wherein R stands for hydrogen or a saturated or unsaturated monovalent organic radical, and R' stands for a saturated or unsaturated monovalent organic radical.

It seems that the best stabilizing action is obtained with halogenated esters in which halogen is attached to the C atom once removed from the phosphorus atom, i.e. to esters which contain at least one halogen on the vicinal carbon atom bound to the oxygen of the phosphoric acid, as shown in Equation 1.

If halogen containing epoxy compounds are reacted with the phosphorus trihalide, the ester groups of the obtained compounds contain additional halogen corresponding to the number of halogen atoms of the epoxy compound.

If, in the above equation, instead of 3 moles of the same epoxy compound mixtures of different epoxy compounds are employed, corresponding mixed phosphites are obtained. In this case, we prefer to start the reaction with the more volatile epoxy compound and finish it with the higher boiling compound.

The same compounds as in Equation 1 are obtained by reacting the phosphorus trihalide with vicinal chlorohydrines, whereby hydrogen chloride is split off. Hydrogen chloride binding agents, such as alkali metal hydroxide or tertiary amines, may be added to eliminate the hydrogen chloride. This reaction is, for simple compounds, represented by the following equation (2) 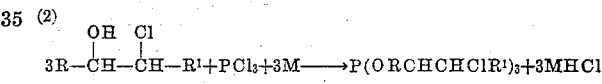

wherein M stands for an alkali metal hydroxide or a tertiary amine such as pyridine, trimethylamine, and the like.

Any type of vicinal epoxy compound may be used for the reaction; particularly suitable are aliphatic, alicyclic or aromatic hydrocarbon epoxides and their halogen substituted derivatives; glycidyl and other epoxide ethers; alcohols, acids, and esters containing epoxy groups. Representative examples of the recited groups are ethylene oxide, propylene oxide, butylene oxide, diisobutylene oxide, 1,2-epoxy dodecene, 1,2-epoxy hexadecene; epichlorohydrin; styrene oxide, alpha-methyl styrene oxide, cyclohexene oxide; glycidyl alkyl and aryl ethers, e.g. glycidyl ethyl ether, glycidyl allyl ether, glycidyl phenyl ether, glycidyl octyl phenyl ether, glycidyl ether of bisphenol A; 9,10-epoxy octadecyl ethers; 9,10-epoxy butyl stearate; 10,11-epoxy ethyl undecylenate; epoxidated glycerides derived from soybean, cottonseed, fish and other unsaturated oils; glycidol, 10-11-epoxy undecanol, 9,10-epoxy octadecanol, 9,10-epoxy octadecanoic acid.

Also polymeric epoxy compounds having 2 epoxy groups on both ends of the linear polymer chain can be used for the preparation of phosphites. Such polymeric epoxides are usually prepared by condensing dihydric phenols with epichlorohydrine; they have the structure:

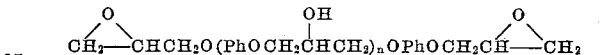

where Ph represents the aromatic portion of a dihydric phenol and $n$ is a fractional number representing the degree of polymerization, which depends on the reaction conditions.

By reacting such a difunctional epoxy compound with the three functional phosphorous trihalide, polymers result which become insoluble if too highly cross-linked.

We prefer, therefore, to limit the size of the polymer by reacting first the PCl₃ with a monofunctional epoxy compound and subsequently with the polymeric di-epoxy compound.

High boiling epoxy compounds, for instance the epoxidized oils, are mostly not pure compounds and carry their impurities into the obtained end products, where they do not affect the stabilizing properties.

The reaction between phosphorus trihalide and epoxy compounds is highly exothermic; the reaction temperature may vary within wide limits. In certain cases, for example with bulky molecules, halogenation catalysts like aluminum chloride, boron trifluoride and the like, may be added to ensure complete reaction. In other cases, catalysts must be avoided because they might cause too violent reaction.

The obtained compounds are colorless viscous liquids which decompose on distillation. They have excellent stabilizing properties and are much easier prepared and considerably less expensive than the halogen-free organic phosphites. Particularly suitable are those compounds which have at 200° C. a vapor pressure of less than 5 mm.; but as they are effective already in small amounts and have no unpleasant smell or irritating properties, also more volatile halogenated phosphorous acid esters can be employed.

The phosphites of the invention can be used in a wide range of proportions, for example from 0.1 to 10%, preferably 0.5 to 2% by weight of the halogen-containing resin. They may be used alone, or preferably in synergistic combination with other stabilizers such as organo-tin compounds and/or salts of bivalent or tetravalent metals. Examples are salts of the earth alkali metals, magnesium, cadmium, zinc and tin with fatty acids containing from 6 to 18 carbon atoms, for instance hexoic acids, 2-ethylhexoic acid, capric acid, caprylic acid, caproic acid, lauric acid, myristic acid, oleic acid, stearic acid, ricinoleic acid and others. Also mixtures of these salts, or double salts, for instance bariumcadmium or calcium-zinc salts, may be used. In general, about 1 to 5 percent of these salts or mixtures of salts based on the dry weight of the resin are sufficient to obtain good stabilizing effects in combination with the recited phosphites. The new phosphite stabilizers are also useful in combination with any kind of the widely used lead stabilizers, where they greatly reduce the opacity normally present in such lead stabilized resin articles on vinyl chloride basis. Such lead stabilizers are inorganic or organic lead salts, e.g. the basic carbonate, salicylate, maleate, 2-ethyl hexoate, phosphite, basic silicate, basic phthalate, basic maleate, the stearate, ricinoleate, and the like.

It is known that epoxide-phosphite combinations have an increased stabilizing effect on halogen containing resins. The invention provides not only a method of obtaining phosphite stabilizers of very high efficiency at low cost but it offers a very economic way to obtain such synergistic stabilizer systems directly as an intimate homogeneous mixture by reacting the phosphorus trichloride with the desired excess of the epoxy compound; in this manner, stabilizer mixtures containing about 0.5 to 5 percent of the phosphite and 0.5 to 5 percent of the epoxy compound, based on the weight of the resin, can readily be obtained, and these mixtures can be added to the resin alone or preferably in addition to the primary stabilizers recited hereinabove. If chlorinated phosphite-epoxy compound mixtures are prepared, such epoxy compounds should be used for the reaction which have a vapor pressure not exceeding 10 mm. at 100° C.

Our novel auxiliary stabilizers may be used for all types of halogen-containing resins for which the recited primary metal salt stabilizers are normally employed, and they increase the heat and light stability of such resins while reducing the cloudiness sometimes imparted by said metal salts. An illustrative list of such resins is, for instance, given in our Patent No. 2,592,926.

In the following examples, we describe first more in detail the preparation of representative chlorinated phosphorous acid esters, some of which we believe were never described before, and then show the beneficial results obtained by the use of said compounds as stabilizer.

*Example 1*

180 g. (3 mols+5% excess) of propylene oxide were slowly added under cooling to 137.4 g. (1 mol) of phosphorus trichloride. The temperature was gradually raised from 25° C. to 40° C. After 2½ hours, the reaction was completed, and the batch was refluxed for another hour. The solution was then stirred with 5 g. of dry sodium carbonate and filtered. Yield=96.5%. The obtained tris (2-chloropropyl) phosphite had a boiling point of 152° C./5 mm., a specific gravity at 20° C. of 1.2723, and a refractive index at 20° C. of 1.4597. We believe it to be a mixture of the two possible isomers

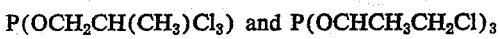

*Example 2*

In the same manner as in Example 1, tris(2,3-dichloropropyl)phosphite was obtained in 92.6% yield by the reaction of 1 mol of PCl₃ and 3 mols of epichlorohydrine. Sp. gr.=1.4494. Ref. ind.=1.5129. The isomeric compounds have the formula P(OCHCH₂ClCH₂Cl)₃ and P(OCHCH₂ClCH₂Cl), respectively.

The compound could not be distilled without decomposition.

*Example 3*

1 mol of phosphorus trichloride was reacted with 2 mols of diisobutylene oxide (1,1,3,3-tetramethyl 2,3-epoxy butane) and 1 mol of propylene oxide. Bis (1,1,3,3-tetramethyl 2-chlorobutyl) 2-chloropropyl phosphite having a refractive index of 1.4663 was obtained in a yield of 70.2%. The ester had the formulae

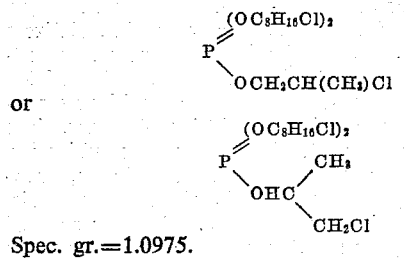

Spec. gr.=1.0975.

*Example 4*

1 mole of phosphorus trichloride was reacted with 3 moles of styrene oxide. The obtained product was tris (2-chlorophenylethyl) phosphite of the formula

or

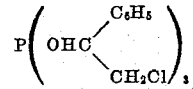

Yield: 98.1%; spec. gr.=1.2553; refr. ind.=1.5758.

*Example 5*

In the same way as in the preceding examples, 1 mole of phosphorus trichloride was reacted with 3 moles of allyl glycidyl ether. The obtained compound was a tris (2-chloropropyl 3-allyloxy) phosphite of the formula

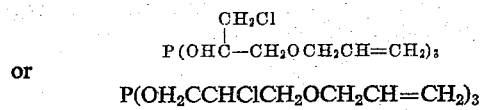

Spec. gr.=1.1954; ref. ind.=1.4877.

*Example 6*

0.3 mole of phosphorus trichloride were reacted first for two hours with 0.6 mole of propylene oxide at 25 to 40° C., as described in Example 1. Subsequently, 0.33 mole of 9,10-epoxystearic acid of 93% purity were gradually added over a period of half an hour at a temperature of 70 to 80° C. and the mixture was stirred until the acid value indicated that the reaction was completed. Bis (2-chloropropyl) 1-octyl 2-chloro 9-carboxynonyl phosphite was obtained in a yield of 89.2%. Spec. gr.=1.1033; ref. ind.=1.4759. The main impurities in the product were stearic acid and palmitic acid, which had been introduced with the epoxy stearic acid.

*Example 7*

0.3 mol of phosphorus trichloride were first reacted with 0.67 mole of phenyl glycidyl ether and subsequently with 0.3 mol of epoxidated soybean oil (5.46% epoxy oxygen content). The mixed chloro-phosphite was obtained in 98.3% yield. Spec. gr.=1.1768; ref. ind.= 1.5262.

When the same reaction was carried out with 1.3 instead of 0.3 mol of the epoxidated soya oil, an equimolar stabilizer mixture of epoxidated soya oil and the mixed chlorophosphite was directly obtained.

*Example 8*

To 0.5 mol=68.7 g. of phosphorous trichloride was added under cooling and stirring 1 mol=58.1 g. of propylene oxide at a temperature not exceeding 40° C. Then, 110.3 g. of araldite KD–283 of the Ciba Co. were added. (Araldite KD–283 is an epichlorohydrine-p,p' dihydroxy diphenyl dimethyl methane condensation product having 7.20% of epoxy oxygen content and an average mol. wt. of about 450.) The temperature was raised to 50° C. and stirring continued until the reaction was complete; 5 grams of propylene oxide were then added to insure complete reaction and to reduce the free acidity. The excess propylene oxide was then removed under reduced pressure. The viscous liquid reaction product which was obtained in 98.9% yield had an acid value of of 4.7. Sp. gr. at 20° C. 1.253:1.253. Refr. index at 20°: 1.5371.

While it is difficult to represent the compound by a simple formula, it is believed that the following formula is representative of the compound obtained.

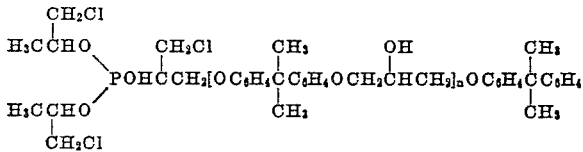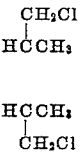

All the described esters were colorless liquids, which mostly could not be distilled without decomposition. During decomposition, a rearrangement appeared to take place with formation of phosphonates.

*Example 9*

800 g. of vinyl chloride resin and 400 g. of dioctylphthalate were blended together, and to the blend were added 16 g. of barium-cadmium laurate (16% Ba, 8% Cd) and 4 g. of epoxidated soybean oil (5.6% epoxy oxygen). The batch was divided in eight equal portions, and to each portion a stabilizer was added in an amount of 1 percent, based on the weight of the vinyl chloride resin. To seven of these portions, each one of the stabilizers prepared according to Examples 1–7 was added, and tris(chloroethyl)phosphite was incorporated in the eighth portion.

The eight batches were milled separately on a 2-roll rubber mill at 330° F. for 10 minutes until a uniformly fluxed sheet was obtained. The sheets were then pressed at 3000 p.s.i. at 330° F. between chrome plated steel plates to films of 40 mil thickness 6" by 6". All films were completely clear and colorless. Two square inch pieces of all these films were then heated in an air circulating oven at 340° F. and at 15 minute intervals samples were removed to observe discoloration. After 120 minutes heating all films had remained clear and only a very slight yellowish cast was observed. No objectionable odor was detected during milling and in the pressed films. From the same sheets 10 mil thick films were calendered and 4" by 4" pieces exposed in the Atlas fadeometer. All films were clear and colorless after 500 hours exposure and did not show brown pinpoints.

As various changes and modifications of the examples may be made without departing from the spirit and scope of the invention, it is to be understood that we do not limit ourselves to the specific embodiments thereof except as defined in the appended claims.

We claim:

1. A heat-resistant resin composition comprising a resinous polymer of vinyl chloride and as stabilizers, calculated on the weight of the resin, about .5 to 5 percent of a vicinal epoxy compound, about 0.1 to 10 percent of a tri (chloro lower alkyl) phosphite, and about 1 to 5 percent of a salt of a metal selected from the group consisting of alkaline earth metals, magnesium, cadmium, zinc, tin, and mixtures thereof with an aliphatic acid containing from 6 to 18 carbon atoms.

2. A heat-resistant resin composition as defined in claim 1 containing about 1 to 5 percent of barium-cadmium laurate and about 0.1 to 2 percent of epoxidated soybean oil.

3. A heat resistant resin composition as defined in claim 1 wherein said tri (chloro lower alkyl) phosphite is tri(2-chloropropyl)phosphite.

4. The composition of claim 1 wherein the resinous polymer of vinyl chloride is a homopolymer.

References Cited in the file of this patent

UNITED STATES PATENTS

| | | |
|---|---|---|
| 1,936,985 | Lommel | Nov. 28, 1933 |
| 2,241,244 | Conary et al. | May 6, 1941 |
| 2,337,424 | Stoner et al. | Dec. 21, 1943 |
| 2,408,744 | Engel | Oct. 8, 1946 |
| 2,441,360 | Kamin | May 11, 1948 |
| 2,456,216 | Richter | Dec. 14, 1948 |
| 2,564,646 | Leistner | Aug. 14, 1951 |
| 2,587,616 | Harman | Mar. 4, 1952 |
| 2,604,459 | Jankowiak | July 22, 1952 |
| 2,726,226 | Werkheiser | Dec. 15, 1955 |
| 2,728,791 | Rowlands | Dec. 27, 1955 |
| 2,773,046 | Dunn et al. | Dec. 4, 1956 |